United States Patent

Mori

[11] 4,293,195
[45] Oct. 6, 1981

[54] SIMULTANEOUS MULTI-BEAM OPTICAL MODULATION SYSTEM

[75] Inventor: Masaaki Mori, Kawasaki, Japan
[73] Assignee: Ricoh Company, Ltd., Japan
[21] Appl. No.: 85,488
[22] Filed: Oct. 17, 1979

[30] Foreign Application Priority Data

Oct. 20, 1978 [JP] Japan ................. 53-129174

[51] Int. Cl.$^3$ .............................................. G02F 1/11
[52] U.S. Cl. .................................................. 350/358
[58] Field of Search ....................................... 350/358

[56] References Cited

U.S. PATENT DOCUMENTS

| | | | |
|---|---|---|---|
| 3,727,062 | 4/1973 | Foster | 350/358 |
| 3,744,039 | 6/1973 | Hrbek et al. | 350/358 |
| 3,935,566 | 1/1976 | Snopko | 350/358 |

*Primary Examiner*—William L. Sikes
*Assistant Examiner*—Léon Scott, Jr.
*Attorney, Agent, or Firm*—McGlew and Tuttle

[57] ABSTRACT

The simultaneous multi-beam optical modulation process comprises the steps of obtaining a plurality of modulated signals with the amplitude of carriers having different frequencies modulated by a plurality of signals, and driving an acoustic optical element by the modulated signals so that a light modulation is performed by the acoustic optical element. In this system, a dummy signal is produced by squaring a plurality of the signals and adding and then inverting the squared signals and a setting voltage for setting an overall deflection efficiency of the acoustic optical element, or by adding and then inverting a plurality of the signals and the setting voltage and then squaring the sum. The amplitude of an assigned carrier is modulated by the dummy signal and a modulated output is obtained. The modulated output and the modulated signals are summed up into a summed-up signal, which is then applied to the acoustic optical system. An apparatus for carrying out the process is also described.

4 Claims, 4 Drawing Figures

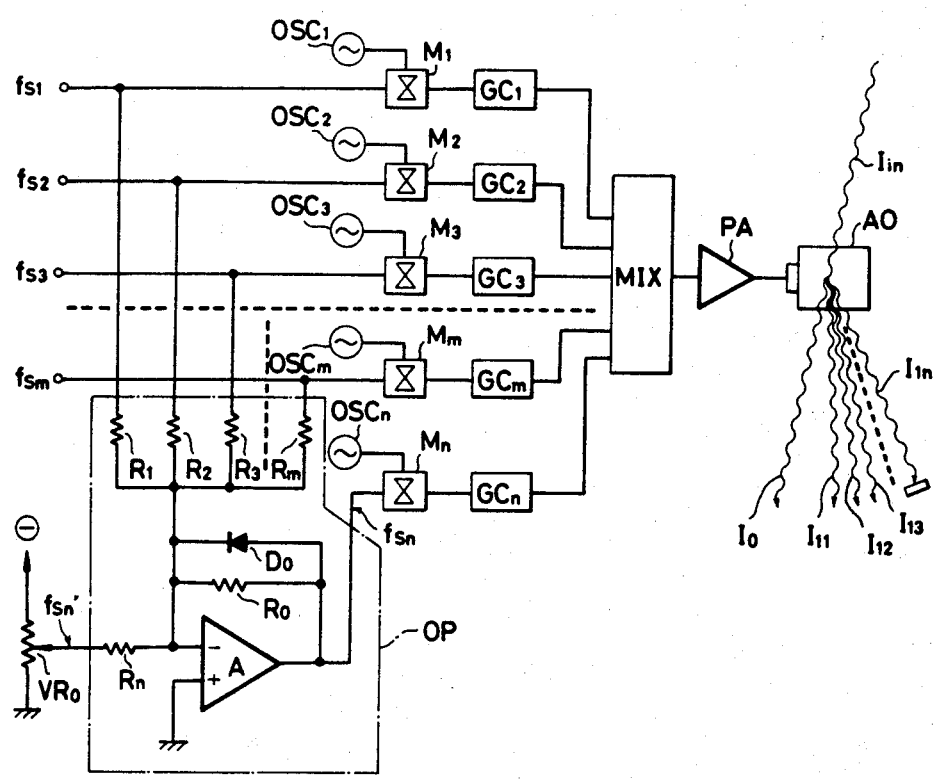
F I G. 1

SIMULTANEOUS MULTI-BEAM OPTICAL MODULATION SYSTEM

BACKGROUND OF THE INVENTION

The present invention relates to a simultaneous multi-beam optical modulation system, which can be employed in a laser printing apparatus.

In a well-known simultaneous multi-beam optical modulation system, a plurality of image signals are assigned to carriers, respectively and the amplitude of each carrier is modulated, whereby a plurality of modulated signals are produced and, at the same time, by the modulated signals, an acoustic optical element is actuated, so that a laser beam is divided and modulated by the acoustic optical element. This system is employed in a laser printing apparatus and is useful in lowering the deflection speed of a scanning optical deflection apparatus. In this system, however, since the acoustic optical element is actuated simultaneously by a plurality of modulated signals, the light modulation intensity of each image signal is changed under the influence of the other image signals, so that cross modulation occurs between the multiple beams from the acoustic optical element.

A system, as shown in FIG. 1, has been proposed for the purpose of obviating such cross modulation. In this system, a plurality of image signals $f_{s1} - f_{sm}$ from a signal source (not shown) respectively modulate the amplitude of the carriers assigned to the respective image signals, from high frequency oscillators $OSC_1 - OSC_m$ in AM modulators $M_1 - M_m$. An addition-reduction inverting amplifier OP comprising resistors $R_0$ to $R_n$ (where $R_0 = R_1 = R_2 = R_3 = \ldots R_n$), a diode $D_0$ and a direct current amplifier A, performs addition of the image signal input voltages $f_{s1}$ to $f_{sm}$ and reduction of a setting voltage $f_{sn}$, set by a variable resistor $VR_0$ and also performs inverse amplification of the image signal input voltages $f_{s1}$ to $f_{sm}$ and the setting voltage $f_{sn'}$. The setting voltage $f_{sn}$, is a voltage for setting the overall deflection efficiency of an acoustic optical element AO and is produced in a setting voltage means or setting means by dividing a power source whose polarity is opposite to that of the image signal input voltages $f_{s1}$ to $f_{sm}$ by use of a variable resistor VRO. In other words, the addition-reduction inverting amplifier OP produces a dummy signal $f_{sn}$ by addition of the image signal input voltages $f_{s1}$ to $f_{sm}$ and the setting voltages $-f_{sn'}$, followed by inversion thereof, namely $f_{sn} = -\{(f_{s1} + f_{s2} + \ldots + f_{sm}) - f_{sn'}\}$. The thus-produced dummy signal $f_{sn}$ modulates the amplitude of carrier assigned by a high frequency oscillator $OSC_n$ in an AM modulator $M_n$.

The output signals of the modulators $M_1$ to $M_n$ are summed up into one signal by a mixer MIX through gain control amplifiers $GC_1 - GC_n$. The summed signal is amplified by a power amplifier PA and is then applied to the acoustic optical element AO. The acoustic optical element AO divides and modulates a laser beam $I_{in}$ from a laser generating apparatus (not shown) and produces deflected light beams of first order, $I_{11}$ to $I_{1m}$ and $I_{1n}$ which respectively correspond to the image signals $f_{s1}$ to $f_{sm}$ and the dummy signal $f_{sn}$ and a light beam of zero order $I_0$. When the dynamic ranges of the image signals $f_{s1}$ to $f_{sm}$ are made equal, the characteristics of image signal to first order deflected light are scattered with respect to each beam. This scattering is caused by the employed electric circuits, the frequency band of the acoustic optical element AO and across modulation between the beams. Since the scattering of the characteristics of image signal to the first order deflected light is caused by the difference of the gain or the gradient of the input and output characteristics, the gain control amplifiers $GC_1$ to $GC_m$ are adjusted so that the input and output characteristics of the respective beams are in agreement.

The minimizing of cross modulation between beams in a simultaneous multi-beam optical modulation system can be attained by use of an acoustic optical element having a broad frequency band and by keeping the intensity of the overall deflection of first order light constant, irrespective of the input of the image signals, and when the employed frequency band is broad, since the characteristics of image signal input to deflection of light of the first order do not differ so much in each beam, a system capable of reducing cross modulation can be realized by keeping the sum of the input of image signals constant. In the simultaneous multi-beam optical modulation system in FIG. 1, the sum of output beams $I_{11}$ to $I_{1m}$ and a dummy beam $I_{1n}$, namely $\Sigma I_1 = I_{11} + I_{12} + \ldots I_{1m} + I_{1n}$ is kept constant. In order to accomplish this, a dummy signal voltage $f_{sn}$ is produced in a manner to make the sum of image signal input voltages $f_{s1}$ to $f_{sm}$ and dummy signal voltage $f_{sn}$, namely $\Sigma f_{s3} = f_{s1} + f_{s2} + f_{sm} \ldots + f_{sn}$, constant.

The simultaneous multi-beam optical modulation system in FIG. 1 is premised on $I_{11} \alpha f_{s1}$, $I_{2} \alpha f_{s2}$, ... However, there is the following relationship between $I_{11}$ and $f_{s1}$ in practice.

$$I_{11} = I_{in} \sin^2 K f_{s1}$$

where K is a constant. Therefore, this system does not have a sufficient cross modulation compensation effect.

SUMMARY OF THE INVENTION

For the foregoing reason, a principal object of the invention is to provide a simultaneous multi-beam optical modulation system with an improved cross modulation compensation effect, by incorporating elements having square characteristic between the input side and the output side of the simultaneous multi-beam optical modulation system.

According to the invention, a plurality of modulated signals is obtained with the amplitude of carriers having different frequencies modulated by a plurality of signals, and an acoustic optical element is driven by the modulated signals, so that a light modulation is performed by the acoustic optical element. A dummy signal is produced by squaring a plurality of the signals and adding and then inverting the squared signals and a setting voltage for setting an overall deflection efficiency of the acoustic optical element, or by adding and then inverting a plurality of the signals and the setting of voltage and then squaring the added and inverted result. The amplitude of an assigned carrier is modulated by the dummy signal and a modulated output is obtained. The modulated output and the modulated signals are summed up into a summed-up signal, which is then applied to the acoustic optical system.

Thus, it is a further object of the invention to to provide an improved simultaneous multi-beam optical modulation process of the type in which a light modulation is performed by an acoustic optical element including the steps of modulating the amplitude of each of a plurality of carriers having different frequencies by applying a respective modulator signal thereto to obtain a plurality of modulated signals, squaring an input voltage of said plurality of modulator signals, adding and then inverting said square voltage of said modulator signals and a setting voltage for setting an overall deflection efficiency of the acoustic optical element to produce a dummy signal, modulating the amplitude of an assigned carrier by the dummy signal to obtain a modulated output, summing the modulated output and the modulated signals into a summed signal, and applying the summed signal to the acoustic optical element.

It is still a further object of the invention to provide an improved simultaneous multi-beam optical modulation process which is simple to perform and economical.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a block diagram of a conventional simultaneous multi-beam optical modulation system;

DESCRIPTION OF THE PREFERRED EMBODIMENTS

In a simultaneous multi-beam optical modulation system, cross modulation between beams can be minimized by keeping the sum of output light $I_{11}-I_{1n}$, namely $\Sigma I_1$. This can be attained by keeping the sum of power of $P_{11}-P_{1n}$ constant, namely, $\Sigma P_1 = P_{11}+P_{12}+\ldots P_{1n}=$ constant, which controls the intensity of output light $I_{11}-I_{1n}$. When the input-output characteristics of each of the input voltages $f_{s1}-f_{sn}$ are equal, $\Sigma P_1 = K(f_{s1}^2 + f_{s2}^2 + \ldots + f_{sn}^2) =$ constant.

In this case, if $f_{s1} \to 0$ and $f_{s2} \to f_{s2'}$, $f_{s1}^2 + f_{s2}^2 = (f_{s2'})^2$. In the simultaneous multi-beam optical modulation system in FIG. 1, it is tried to produce a cross modulation compensation effect by setting $f_{s1} + f_{s2} + = f_{s2'}$. Therefore, a sufficient cross modulation effect is not obtained.

Figure 2:
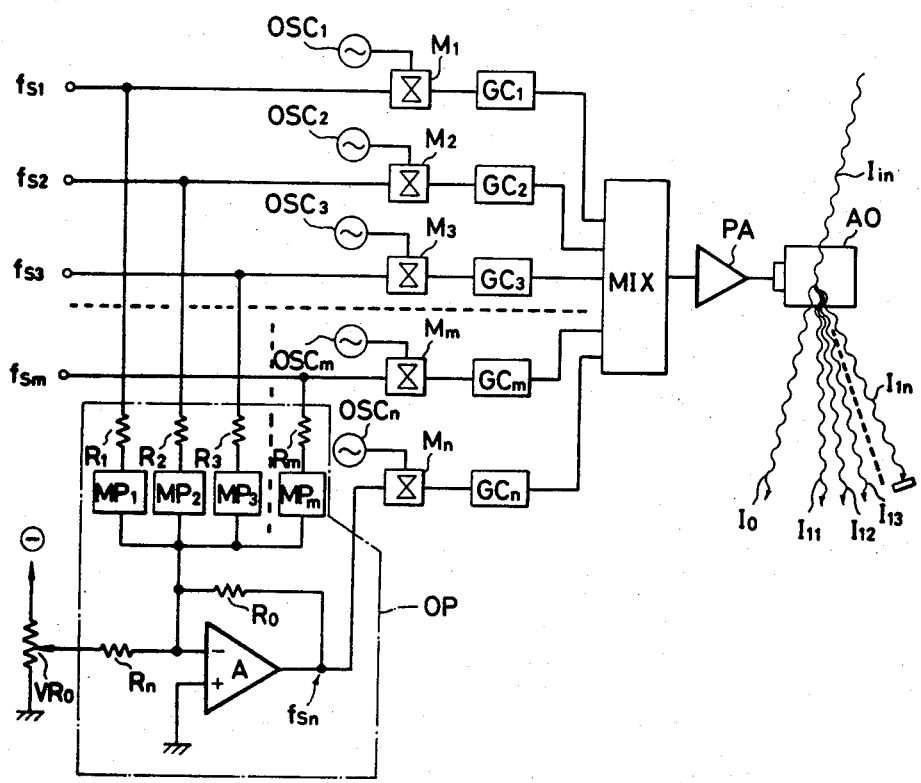
FIG. 2 is a block diagram of an embodiment of a simultaneous multi-beam optical modulation system according to the invention.
Figure 3:
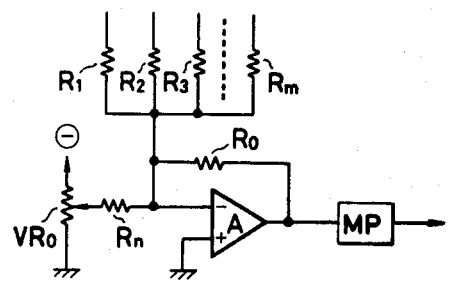
FIG. 3 is a partial circuit diagram of another embodiment of a simultaneous multi-beam optical modulation system according to the invention.

In a first embodiment of a simultaneous multi-beam optical modulation system of the invention, the above-mentioned disadvantage is eliminated. As shown in FIG. 2, the detected voltage of each of signal voltages $f_{s1}-f_{sm}$ is squared via multipliers $MP_1-MP_m$, and each of them is applied to a cross modulation compensation circuit in the forms of $f_{s1}^2, f_{s2}^2, \ldots f_{sm}^2$. As the multipliers $MP_1-MP_m$, commercially available analog multipliers can be employed. Usually, since the input voltages $f_{s1}, f_{s2}, f_{s3} \ldots$ modulate the modulators $M_1, M_2 \ldots$, the voltages are not more than 1 V, and the frequency band is from DC to a few MHz, depending on the characteristics of an acoustic optical element AO. Therefore, it could happen that the frequency band is restricted by the peformance of the multipliers $MP_1-MP_m$. In this multi-beam optical modulation system, since the dummy signal $f_{sn}$ having the square characteristic is always generated, it is possible to obtain a highly accurate cross modulation compensation effect. Referring to FIG. 3, there is shown a second embodiment of a simultaneous multi-beam optical modulation system according to the invention. In this embodiment, the circuits are simplified by adopting one multiplier MP. In this system, since the multiplier MP squares the output signal of the addition-reduction inverting amplifier OP, $f_{sn}$ is obtained as follows:

$$f_{sn} = -\{(f_{s1}+f_{s2}+\ldots f_{sm})-f_{sn'}\}^2$$

Hence, cross terms, such as $f_{s1}.f_{s2}, f_{s1}.f_{s3}, f_{s2}.f_{s3}, \ldots$ may become factors which deteriorate the performance of this system. However, such cross terms can be ignored within a certain limit of operation, so that a fairly good cross modulation compensation effect can be attained.

Figure 4:
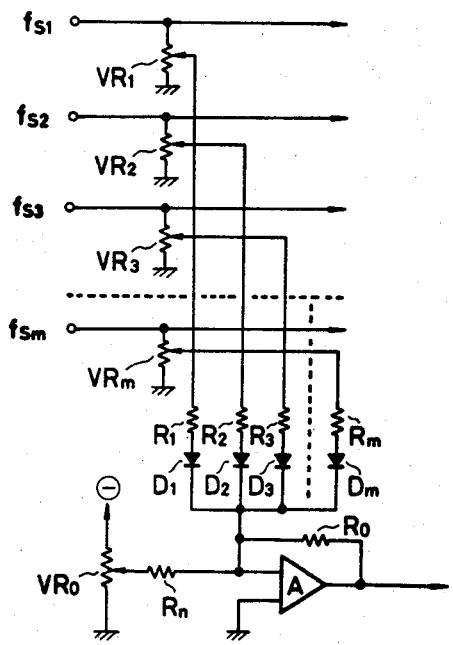
FIG. 4 is a partial circuit diagram of a further embodiment of a simultaneous multi-beam optical modulation system according to the invention.

Referring to FIG. 4, there is shown a third embodiment of the invention. In this embodiment, instead of the multipliers $MP_1-MP_m$ in the first embodiment, diodes $D_1-D_m$ are adopted so that the system have the square characteristic. In order to make the square characteristics of the diodes $D_1-D_m$ equal, variable resistors $VR_1-VR_m$ are adopted so as to adjust the operation characteristics. A good performance was obtained by using germanium diodes as the diodes $D_1-D_m$, by the reason of the voltage.

This system can be constructed easily by use of the diodes, without using expensive multipliers.

As described above, in the simultaneous multi-beam optical modulation system according to the invention, the elaborate cross modulation compensation is possible because the input voltages are squared to obtain the dummy signal.

While specific embodiments of the invention have been shown and described in detail to illustrate the application of the principles of the invention, it will be understood that the invention may be embodied otherwise without departing from such principles.

What is claimed is:

1. In a simultaneous multi-beam optical modulation process of the type having the steps of obtaining a plurality of modulated signals with the amplitude of carriers having different frequencies modulated by a plurality of signals, and driving an acoustic optical element by said modulated signals, whereby a light modulation is performed by the acoustic optical element, the improvement comprising the steps of producing a dummy signal by squaring a plurality of said signals, adding and then inverting said squared signals and a setting voltage for setting an overall deflection efficiency of the acoustic optical element, modulating the amplitude of an assigned carrier by said dummy signal to obtain a modulated output, summing said modulated output and said modulated signals into a summed signal, and applying said summed signal to the acoustic optical element.

2. In a simultaneous multi-beam optical modulation process of the type having the steps of obtaining a plurality of modulated signals with the amplitude of carriers having different frequencies modulated by a plurality of signals, and driving an acoustic optical element by said modulated signals, whereby a light modulation is performed by the acoustic optical element, the improvement comprising the steps of producing a dummy signal by adding and then inverting a plurality of the signals and a setting voltage for setting an overall deflection efficiency of the acoustic optical element, then squaring said sum, modulating the amplitude of an assigned carrier by said dummy signal to obtain a modulated output, summing said modulated output and said modulated signals into a summed signal, and applying said summed signal to said acoustic element.

3. An improved simultaneous multi-beam optical modulation process of the type in which a light modulation is performed by an acoustic optical element comprising the steps of modulating the amplitude of each of a plurality of carriers having different frequencies by applying a respective modulator signal thereto to obtain a plurality of modulated signals, squaring an input voltage of said plurality of modulation signals, adding and then inverting said square voltage of said modulator signals and a setting voltage for setting an overall deflection efficiency of the acoustic optical element to produce a dummy signal, modulating the amplitude of an assigned carrier by said dummy signal to obtain a modulated output, summing said modulated output and said modulated signals into a summed signal, and applying said summed signal to the acoustic optical element.

4. An improved simultaneous multi-beam optical modulation process of the type in which a light modulation is performed by an acoustic optical element comprising the steps of modulating the amplitude of each of a plurality of carriers having different frequencies by applying a respective modulator signal thereto to obtain a plurality of modulated signals, adding and then inverting an input voltage of a plurality of said modulator signals and a setting voltage for setting an overall deflection efficiency of the acoustic optical element, then squaring said added and inverted modulated signals to produce a dummy signal, modulating the amplitude of an assigned carrier by said dummy signal to obtain a modulated output, summing said modulated output signals into a summed signal, and applying said summed signal to the acoustic optical element.

* * * * *